(12) United States Patent
Ranmuthu

(10) Patent No.: US 6,917,484 B2
(45) Date of Patent: Jul. 12, 2005

(54) DAMPING RESISTOR BOOST WRITER ARCHITECTURE

(75) Inventor: Indumini Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 15 days.

(21) Appl. No.: 10/727,268

(22) Filed: Dec. 2, 2003

(65) Prior Publication Data

US 2005/0117244 A1 Jun. 2, 2005

(51) Int. Cl.[7] .................................................. G11B 5/09
(52) U.S. Cl. ........................................... 360/46; 360/68
(58) Field of Search ............................ 360/46, 68, 67, 360/61, 62, 63, 66; 327/108, 110, 423, 494

(56) References Cited

U.S. PATENT DOCUMENTS 6,236,247 B1 * 5/2001 Ngo ............................ 327/110
6,512,646 B1 * 1/2003 Leighton et al. ............... 360/46

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

A write driver apparatus and corresponding method for an inductive head element (20) in a magnetic storage medium, such as a hard disk drive, having an H-bridge type circuit (10) which is capable of driving a current through the inductive head element (20) and having a boost circuit (250, 260) which is coupled with the H-bridge (10) and which is operable for delivering another current during a predetermined period to the head element (20), wherein a sum of the currents provides the write current for the head element (20) of the hard disk drive. Further, a resistive element (210, 320, 330) is selectively coupled with the head element (20) for providing impedance matching in which the resistive element (210, 320, 330) is decoupled from the head element (20) during delivery of the current from the boost circuit (250, 260).

22 Claims, 4 Drawing Sheets

DAMPING RESISTOR BOOST WRITER ARCHITECTURE

FIELD OF THE INVENTION

The present invention relates to magnetic storage mediums and, more particularly, to the write current driver for inductive heads used in the disk drives.

BACKGROUND OF THE INVENTION

Disk drives are employed to store large amounts of information in bits encoded on tracks on the disk in a series of logical 1's and 0's. These logical 1's and 0's are represented in bit cells, which are areas of uniform size along the length of the tracks on the disk. It is desirable that the information bits be encoded on the disk as densely as practical so that a maximum amount of information may be stored.

Conventionally, logical 1's are recorded as transitions in magnetic flux on a magnetic disk for a given bit cell, and the absence of a transition indicates a logical 0. These transitions are created by switching the write current polarity through the write head. The density of the stored memory in a typical disk depends on how close the data can be written into disk. For an inductive head writer, the write current rise and fall times directly affect the density of a magnetic storage medium. The faster the write current rise and fall time, the faster the change of the magnetic flux, and consequently more bits per inch can be stored in the media.

Due to the inductive nature of a write circuit head and the output capacitances associated with the write circuitry, ringing effects occur in the write current signal which tend to delay the settling of the write current to its final DC value. These ringing effects adversely affect both transition placement and bit cell size concerns. One option when ringing effects are present is to simply wait for the write current to settle to its final DC value and then enable the next transition for encoding a bit. This option means that bit cell duration must be increased to allow time for the write current to settle. While the accuracy of transition placement within bit cells in such a system will not be negatively affected by the ringing of the write current, the density of bit encoding by the write circuit is poor in comparison to desired goals. Another option when ringing effects are present is to switch the write current before it has settled to its final value. This approach maintains acceptable encoding density but results in decreased placement accuracy of bit encoding and hinders subsequent recovery of data from the disk. More particularly, if the write current has not fully settled from a prior transition, switching for the next transition might commence at totally different, uncontrolled, current levels, which results in sporadic placement of transitions in bit cells. Therefore, both options entail undesirable performance trade-offs where ringing effects are present.

One known solution to the ringing problem has been to connect a damping resistor across the terminal of the write head. Unfortunately, since some of the write current is diverted through the damping resistor, write current through the head inductor is reduced which operates to slow down the rise and fall time of write current transitions. While resistive damping does reduce the ringing effects, the slower rise times may not be acceptable for high performance write circuits. What is needed is a damping architecture which does not adversely effect switching frequency.

SUMMARY

The present invention achieves technical advantages as an apparatus and method for driving a write current for an inductive head element in a magnetic storage medium, such as a hard disk drive, including an H-bridge type circuit which is capable of driving a current through the inductive head element and a boost circuit which is coupled with the H-bridge and which is operable for delivering another current during a predetermined period to the head element, wherein a sum of the currents provides the write current for the head element of the hard disk drive. Further, a resistive element is selectively coupled with the head element for providing impedance matching in which the resistive element is decoupled from the head element during delivery of the current from the boost circuit.

BRIEF DESCRIPTION OF THE DRAWINGS

For a more complete understanding of the present invention, reference is made to the following detailed description taken in conjunction with the accompanying drawings wherein.

DETAILED DESCRIPTION

Figure 1:
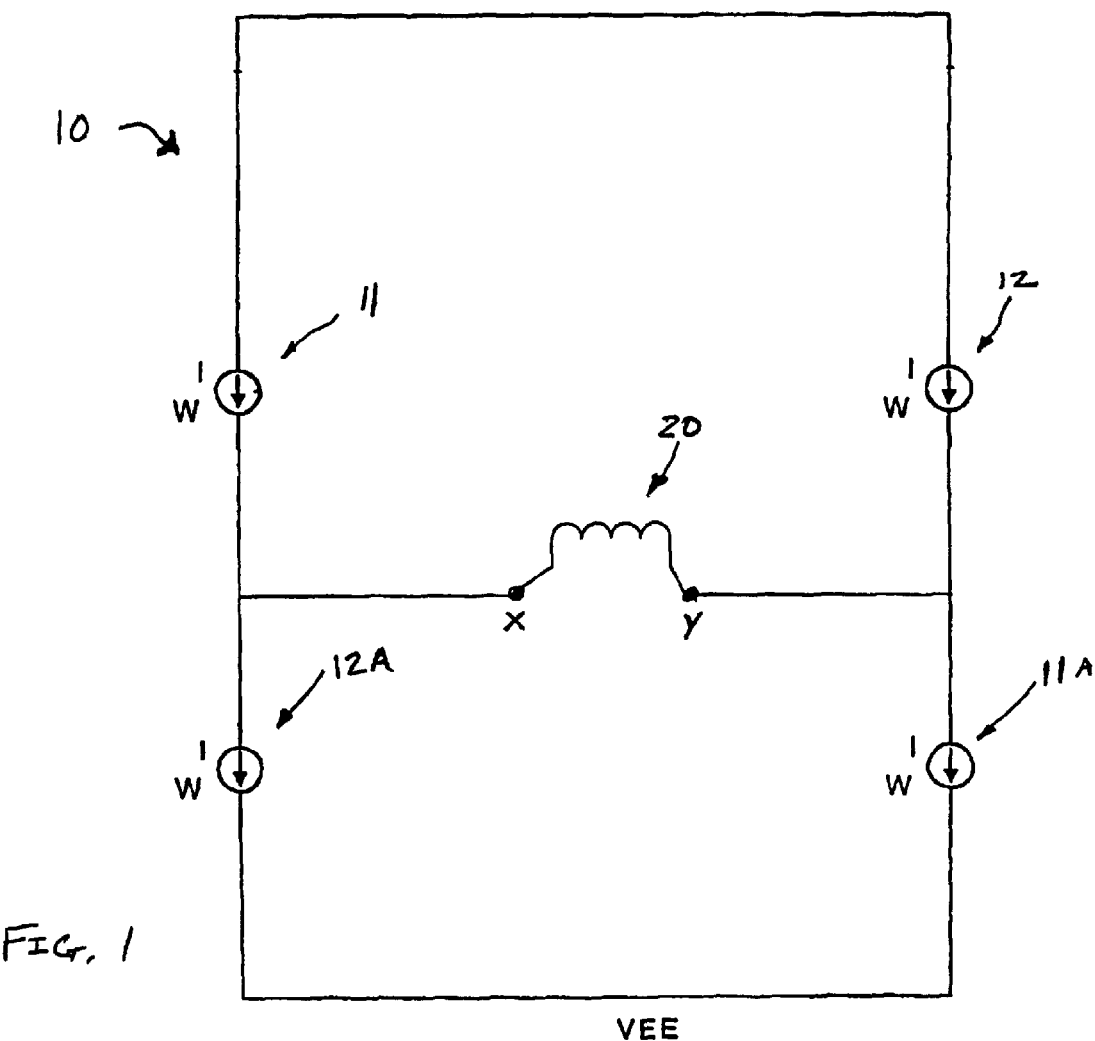
FIG. 1 illustrates an H-bridge type write driver constructed in accordance with embodiments of the present invention.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Referring now to FIG. 1 there is illustrated a simplified H-bridge type circuit typically used for driving current through a write head 20. The purpose of the H-bridge is to enable current to be driven through the write head in either direction. The H-bridge operates to switch the drive current through the head by turning on a pair of current sources enabling a DC write current to flow in a path from a supply source to ground. For example, current flows through the write head 20 from node X to node Y when current sources 11 and 11A are turned on and current sources 12 and 12A are turned off. Similarly, current flows the opposite direction when current sources 11 and 11A are turned off and current sources 12 and 12A are turned on. As mentioned above, damping resistors are used to control the ringing effect from the switching currents.

Figure 2:
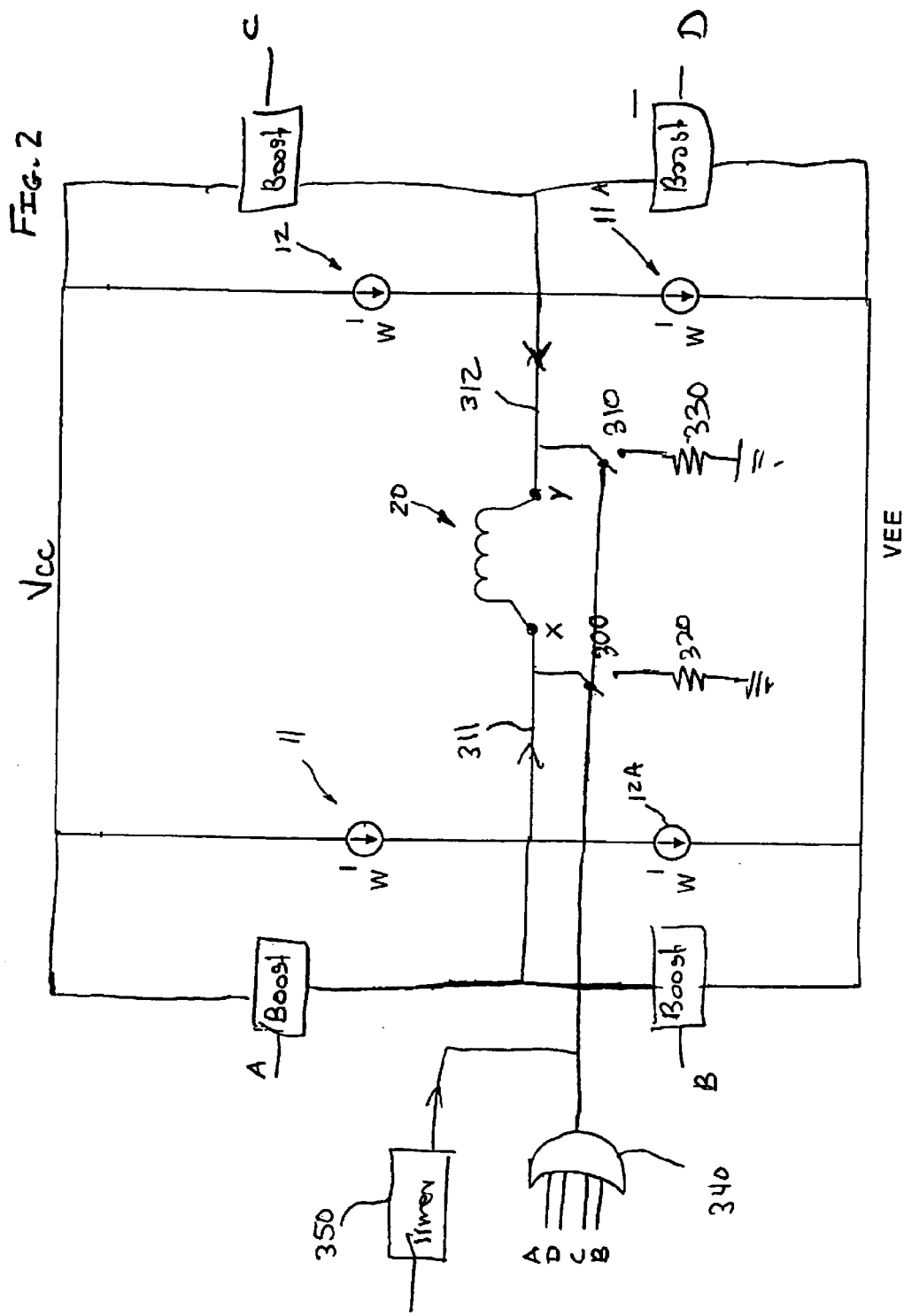
FIG. 2 illustrates a damping architecture for a write driver in accordance with exemplary embodiments of the present invention.

Referring now to FIG. 2 there is illustrated a damping architecture for a write driver in accordance with exemplary embodiments of the present invention. The damping architecture includes the above-mentioned H-bridge circuit, current booster circuitry, and selectively switchable resistive elements. The current boost circuitry includes a boost circuit (A, B, C, and D) coupled with current sources 11, 11A, 12 and 12A. The boost circuits A, B, C, and D and current sources 11, 11A, 12 and 12A are cooperable for providing the current signal to the head 20. The current signal is provided in substantially equal magnitudes of opposite polarities through paths 311 and 312.

Figure 3:
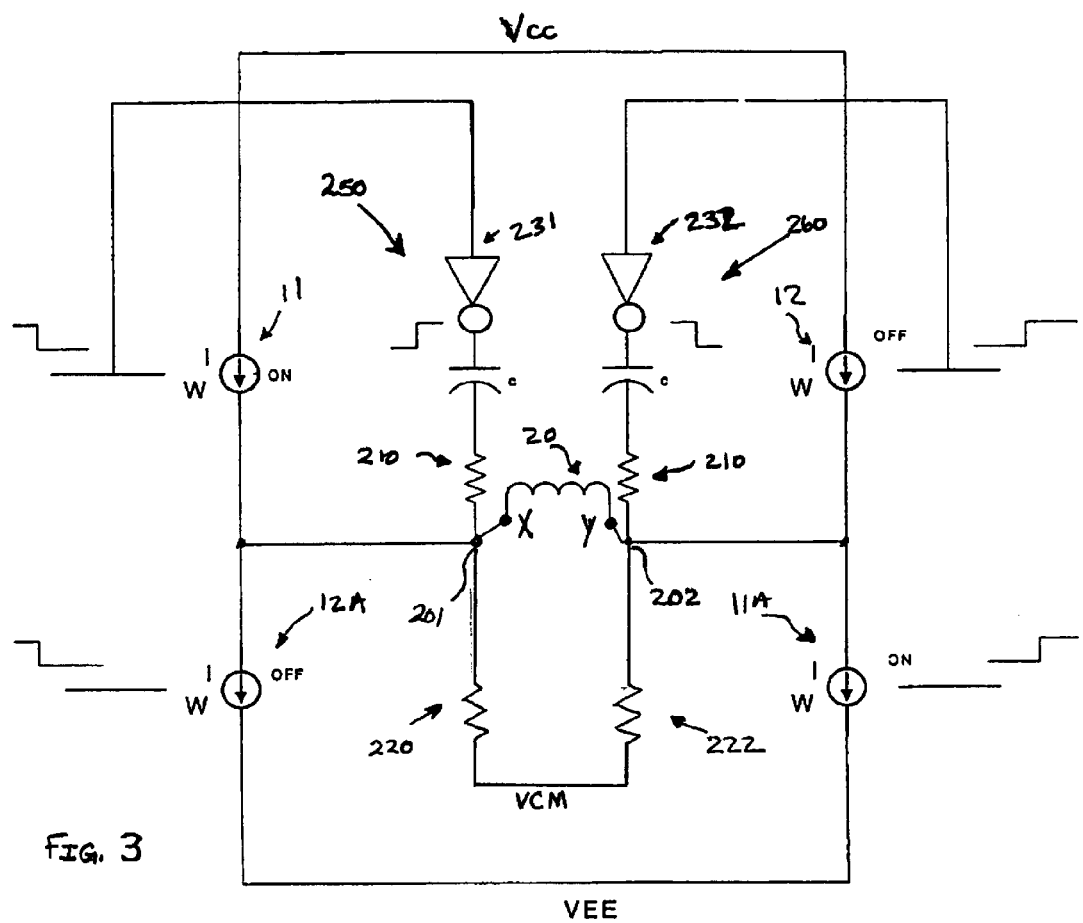
FIG. 3 shows the damping architecture illustrated in FIG. 2 with the H-bridge type write driver illustrated in FIG. 1.
Figure 3A:
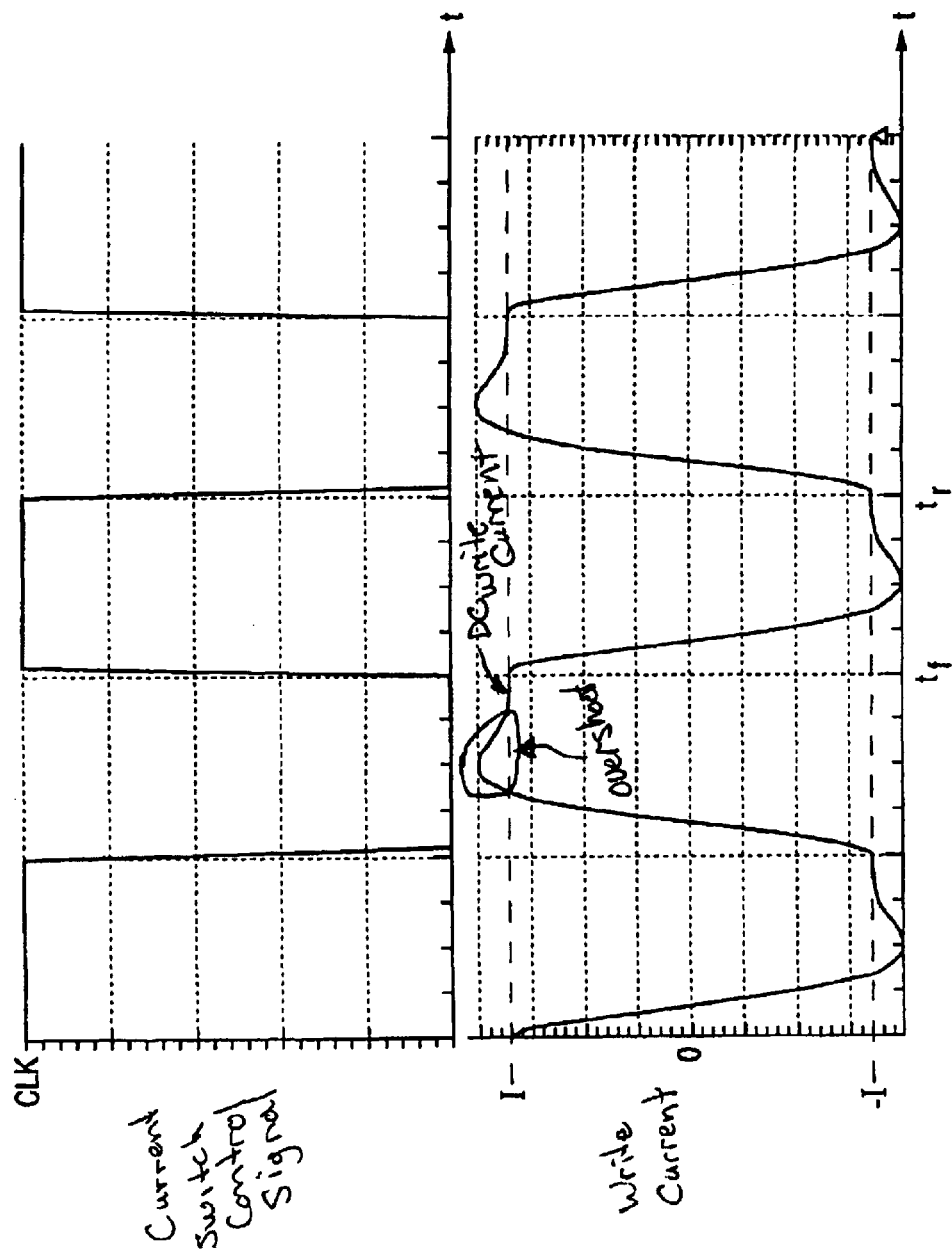
FIG. 3A shows a graphical representation of the current switch control signal and corresponding write current signal.

As can be seen in FIG. 3A, the conventional H-bridge portion provides the DC write current signal portion and boost circuits A, B, C, and D provide the boost signal portion which is seen as an overshoot. The current boost enables a quick transition to the desired DC write current or fast write current rate change and also gives an overshoot of the write current which will speed up the flux translation of the write head. Rise time (tr) and fall time (tf) corresponding to the speed at which current can reverse through the inductive write head 20. The write frequency of the head current transition is increased, by providing the current boost (which is seen as an overshoot on a current waveform as illustrated in FIG. 3A) to more quickly reach the DC write current of the head 20 and also to speed up the flux transition of the write head.

The damping architecture further includes a pair of selectively switchable resistive elements. Each of the switchable resistive elements includes an impedance matching resistor 320 and 330 and a series coupled switch 300 and 310 coupled between the head 20 and ground reference. In operation, the resistors 320 and 330 are switched out of the circuit during the time of the boost and switched in subsequent to collapse of the overshoot. Impedance matching can be omitted during this period since it takes a determinable period of time before a reflected signal will return from the head 20.

Since impedance matching is omitted during this boost period, a full current boost is delivered to the head without loosing current through resistors 320 and 330. The switches 300 and 310 can be controlled via an OR gate device. The inputs to the OR gate device is the boost activate signals from each of the boost circuits A, B, C, and D such that if any of the boost circuits are active switches 300 and 310 are open. Additionally, the OR gate device can include a timer which is triggered on a switch in the write current. The timer is enabled with a predetermined time-out such that the switches 300 and 310 remain open for a short period (corresponding to the time period for collapse of the overshoot or during the time it takes for the reflection to come back) of time following activation of the boost circuits A, B, C, and D.

Referring now to FIG. 3 there is illustrated another damping architecture for a write driver in accordance with exemplary embodiments of the present invention. The damping architecture includes the above-mentioned H-bridge circuit and two parallel AC coupled complementary coordination circuit portions 250 and 260 each having an inverter 231 series coupled with a capacitance C and a damping resistor or resistive element 210. Circuit portions 250 and 260 are cooperable with the H-bridge to provide a write current to the write head 20 at nodes 201 and 202 in which the H-bridge portion provides the DC write current signal portion at nodes 201 and 202 and circuit portion 250 and 260 provide the boost signal portion at nodes 201 and 202. The architecture can also include a control unit coupled to each circuit for providing control signaling. As is known in the art, the control unit has an input for receiving a data signal and responsive thereto is capable for providing the control signaling to coordinate the current signal through the head.

In operation, current source 11 is turned ON via write transition signal (write transition signal CLK as shown in FIG. 3A) from a voltage value corresponding to a digital high signal to a digital low signal. Here, current source 11 and 11A provide the DC write current. This high to low CLK signal is provided to the inverter 231 and its inverse is provided to inverter 232. This causes a positive current pulse to be delivered to node 201 and negative current pulse to be delivered to node 202. As the capacitor charges, the current subsequently decays and the impedance matching is provided via resistors 210. At the same time, the summation of the current provided by the sources and the boost is illustrated in FIG. 3A. In this manner, the boost is not adversely effected by the presence of the impedance matching resistors. When the CLK signal goes low to high the same as above happens in the opposing polarity. Network 220 from node 201 to ground and network 222 from node 202 to ground make sure the write head voltage stays close to ground after boost is over. One implementation of such network could be a large resistor.

By controlling the supply voltage to inverters 231 and 232 the amount of boost current can be controlled.

By applying sufficiently large supply voltage to the inverters it is possible to make nodes 201 and 202 produce a voltage greater than the preamp power supply voltage. This would enable for the writer to launch voltage to the head greater than the preamp power supply voltage.

Although exemplary embodiments of the invention are described above in detail, this does not limit the scope of the invention, which can be practiced in a variety of embodiments.

What is claimed is:

1. A write driver for an inductive head element in a disk drive system, said driver comprising:
    an H-bridge circuit capable of driving a first current through said head element;
    a boost circuit coupled with said H-bridge and operable for delivering a second current during a time period to said head element responsive to a control signal, wherein a sum of said first current and said second current provides the write current for said head element; and
    a resistive element selectively coupled with said head element for providing impedance matching for said head element, said resistive element is decoupled from said head element during said second current time period.

2. The write driver of claim 1, wherein said resistive element is selectively coupled between said head element and a ground reference during periods of said first current and decoupled from said head element during periods of said second current time period.

3. The write driver of claim 1, wherein said resistive element comprises a series coupled resistor and switch, said switch coupled between said resistor and said head element, wherein said switch is open during said second current time period.

4. The write driver of claim 3 further including a control device operatively coupled to said switch for opening said switch responsive to said boost circuit control signal.

5. The write driver of claim 4 further including a timer device coupled with said switch and operable for closing said switch following a predetermined time period subsequent to said control signal.

6. The write driver of claim 1, wherein said control device is an OR gate.

7. The write driver of claim 1, wherein said resistive element is integral with said boost circuit and comprises an inverter, a capacitor, and a resistor coupled in series to said head element, said control signal is provided to said inverter for inverting said signal and providing a pulse corresponding to inverted signal to said head element via said capacitor.

8. The write driver of claim 1, wherein said boost circuit includes a first circuit for providing current in a first direction through said head element and a second circuit for providing current in a second direction through said head element, each of said first circuit and said second circuit are responsive to a respective control signal.

9. The write driver of claim 8, wherein each of said first circuit and said second circuit includes respective resistive elements.

10. The write driver of claim 9, wherein said resistive element is selectively decoupled from said head element during periods of said second current time period or during the period it takes for the reflection from the head to come back.

11. The write driver of claim 9, wherein said resistive element is selectively decoupled from said head element during period taken for the reflection to come back from the write head.

12. A hard disk drive system comprising:
    a magnetic storage media;
    a inductive head associated with said magnetic storage media for magnetizing small regions thereon responsive to a temporary magnetic field created via drive signal through said inductive head;
    a first current driver coupled with said inductive head and operable for providing a first current in either of two directions through said inductive head;
    a second current driver coupled with said inductive head and operable for providing a second current in either of said two directions, wherein said first current and said second current are coordinated to provide said drive signal in substantially equal magnitudes of opposite polarities;
    a resistive element operable to be selectively coupled with said inductive head for providing impedance matching during selected time periods of said drive signal.

13. The hard disk drive system of claim 12 further including a control unit coupled with said first current driver and said second current driver for effecting complementary coordination of said drive signal.

14. The hard disk drive system of claim 12, wherein a sum of said first current and said second current defines said drive signal.

15. The hard disk drive system of claim 12, wherein said second current is provided during a time period immediately following a switch in polarity of said drive signal.

16. The hard disk drive system of claim 12, wherein said resistive element is coupled between said head element and a ground reference except during periods said second current is provided or during the period it takes for the reflection from the head to come back.

17. The hard disk drive system of claim 12, wherein said resistive element comprises a series coupled resistor and switch, said switch is coupled between said resistor and said inductive head, wherein said switch is open during said periods said second current is provided.

18. The hard disk drive system of claim 17 further including a control device operatively coupled to said switch for opening said switch during said periods said second current is provided.

19. The hard disk drive system of claim 18, wherein said control device is an OR gate.

20. The hard disk drive system of claim 17 further including a timer device coupled with said switch and operable for closing said switch following a predetermined time period subsequent to said control signal.

21. The hard disk drive system of claim 12, wherein said resistive element is integral with said second current driver and comprises an inverter, a capacitor, and a resistor coupled in series to said inductive head.

22. The hard disk drive system of claim 21, wherein the supply to the inverter can be set to produce voltage into the inductive head greater than the preamp power supply voltage.

* * * * *